July 30, 1935. F. B. McKUNE 2,009,699
APPARATUS FOR BOTTOM POURING
Filed Nov. 26, 1932 8 Sheets-Sheet 1
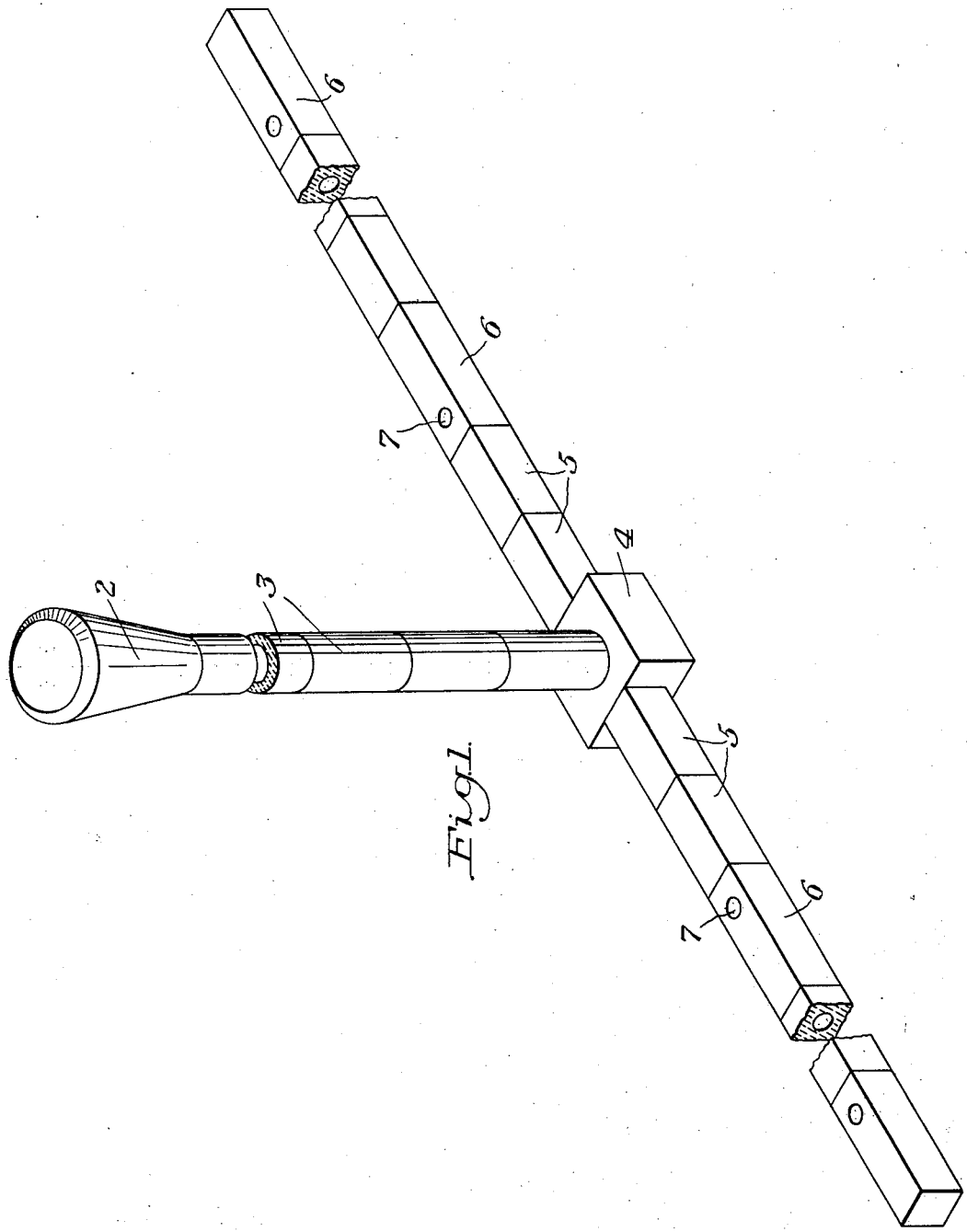

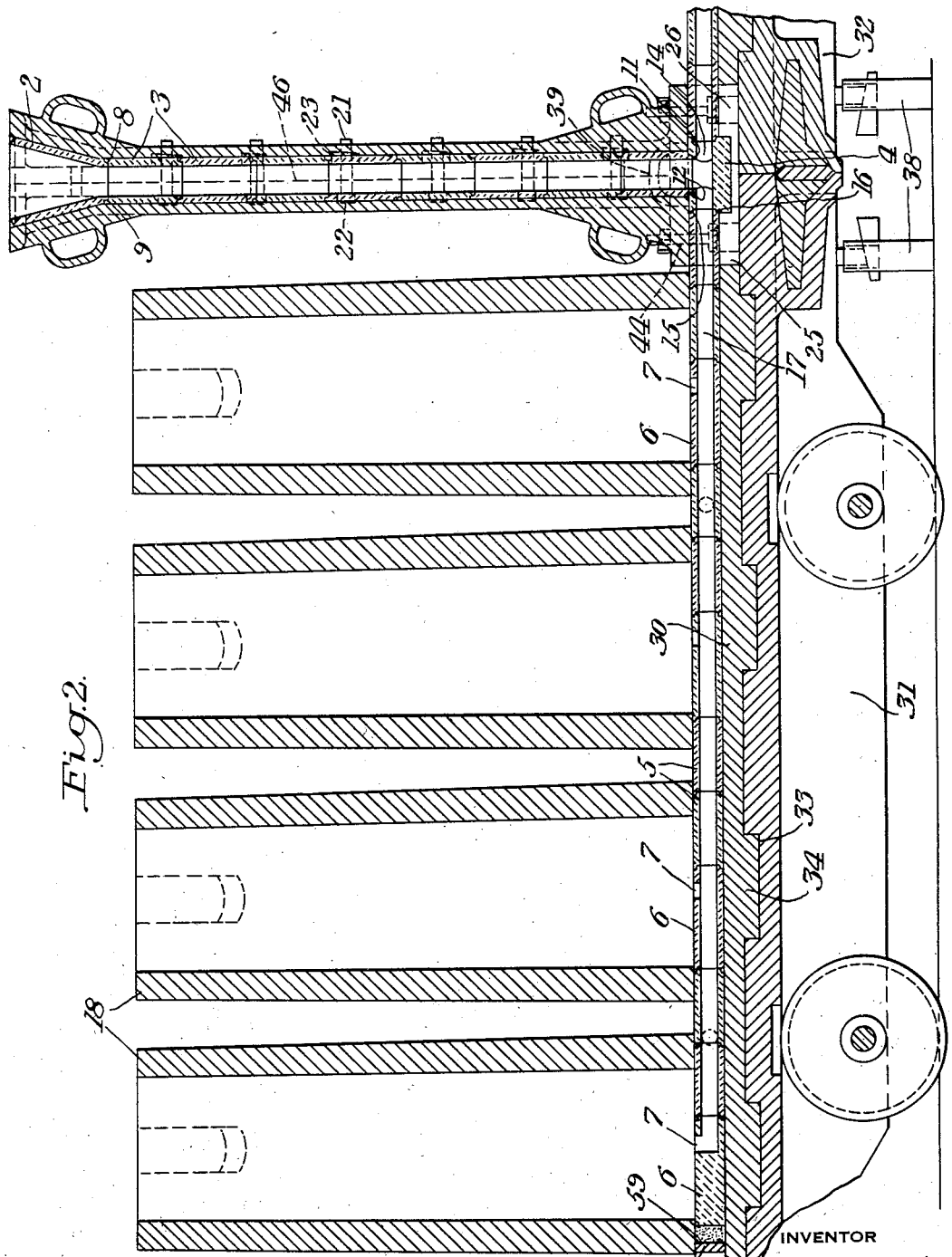

July 30, 1935. F. B. McKUNE 2,009,699
APPARATUS FOR BOTTOM POURING
Filed Nov. 26, 1932 8 Sheets-Sheet 3
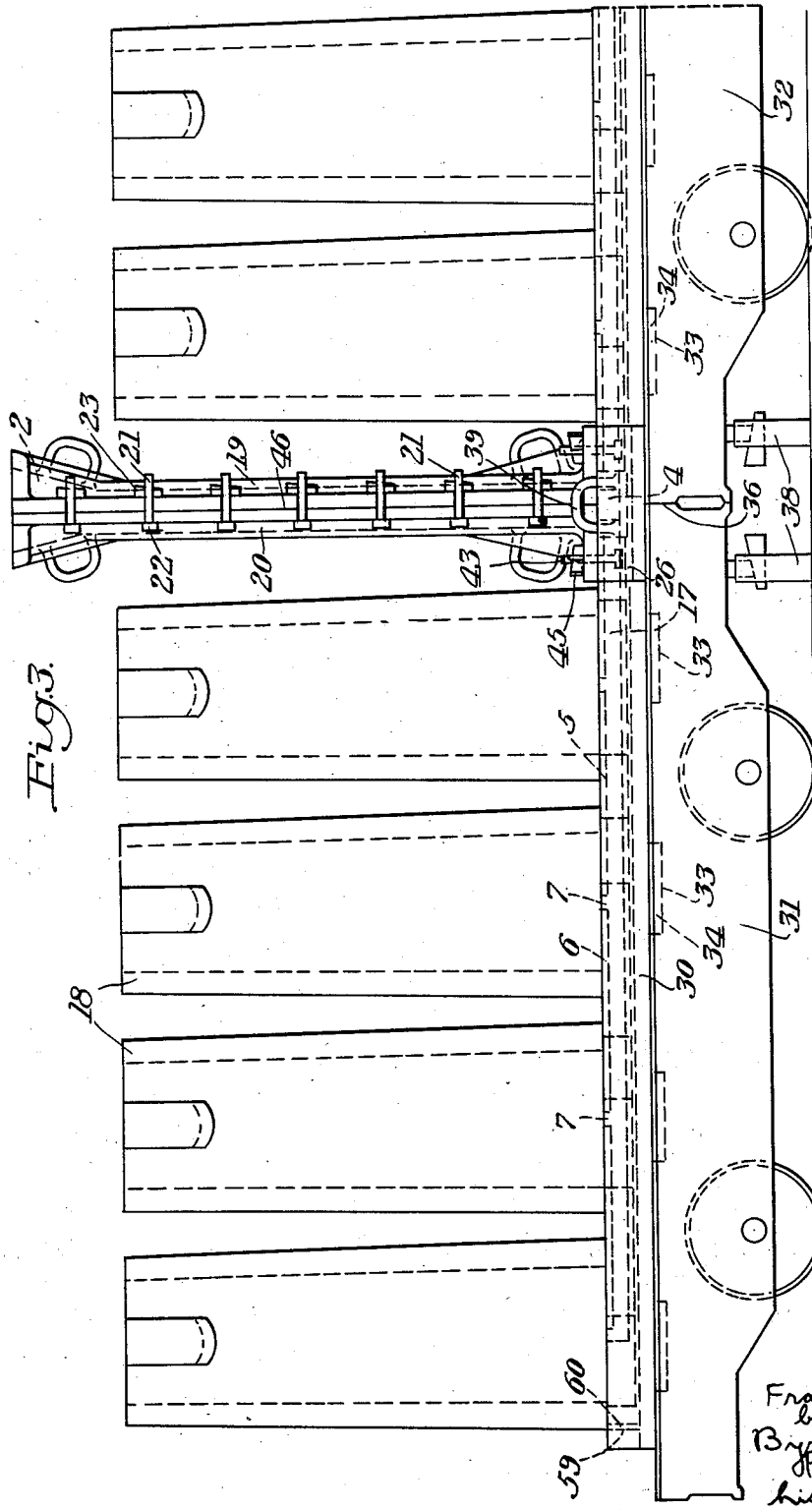

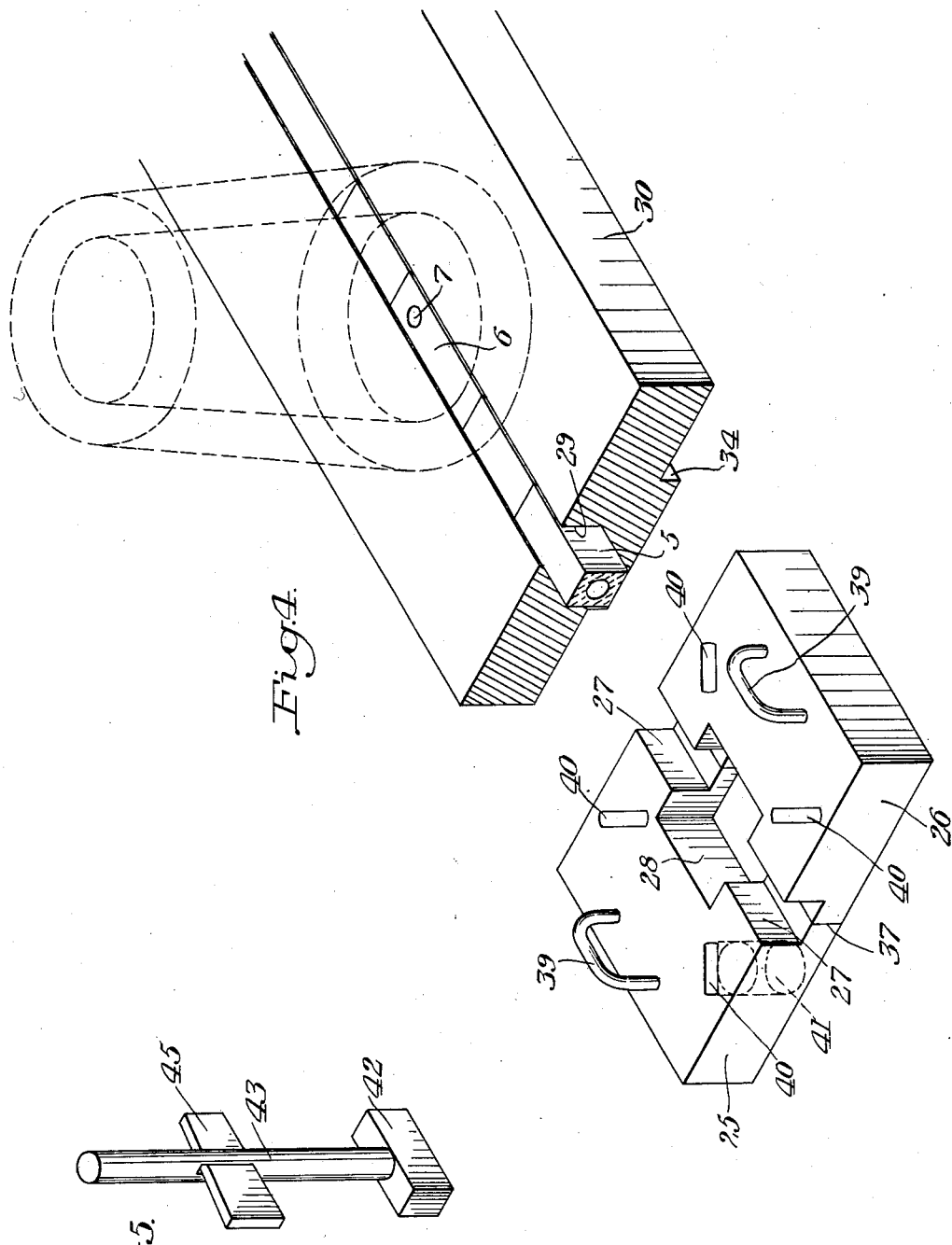

July 30, 1935.　　F. B. McKUNE　　2,009,699
APPARATUS FOR BOTTOM POURING
Filed Nov. 26, 1932　　8 Sheets-Sheet 5
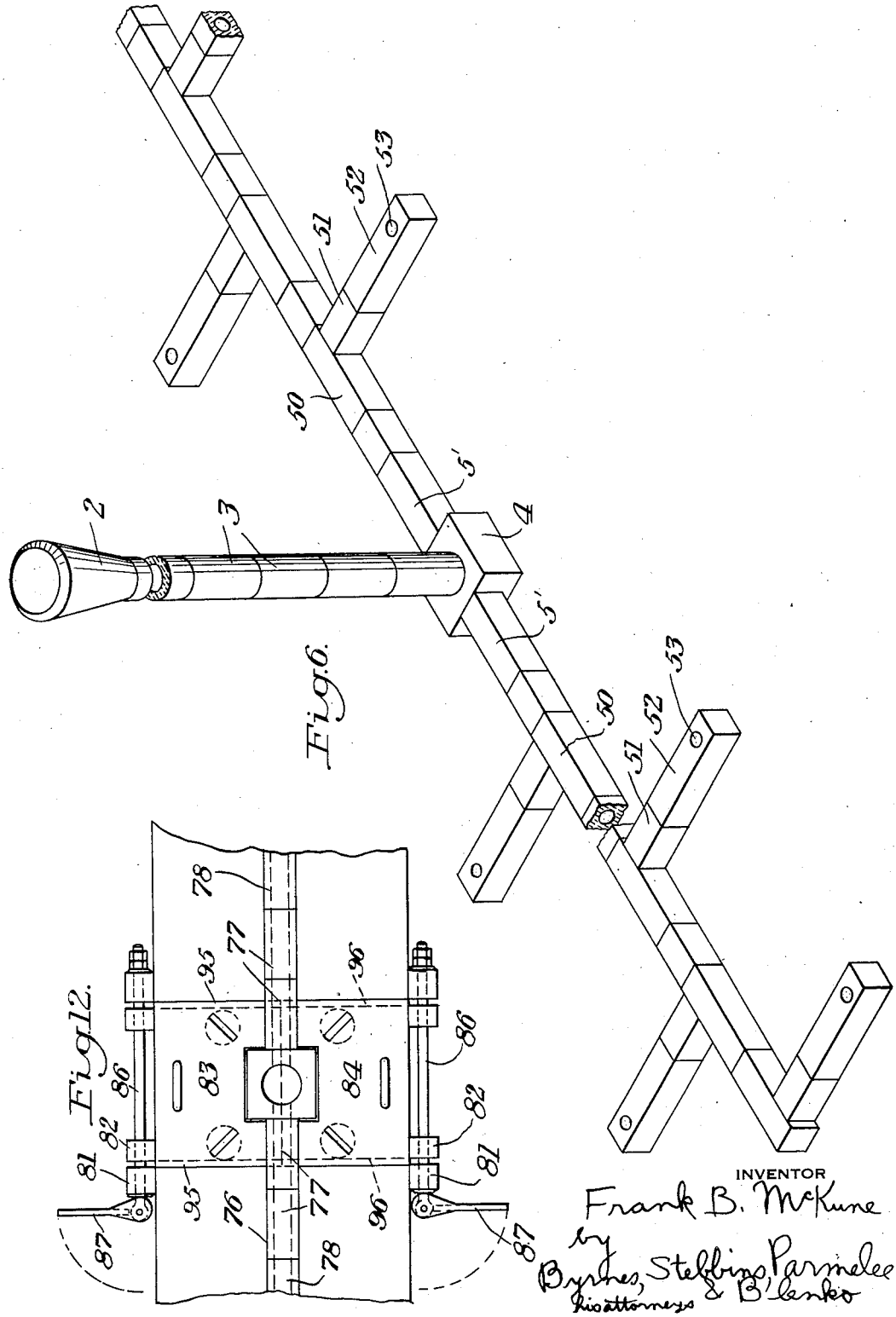

July 30, 1935.  F. B. McKUNE  2,009,699
APPARATUS FOR BOTTOM POURING
Filed Nov. 26, 1932  8 Sheets-Sheet 6
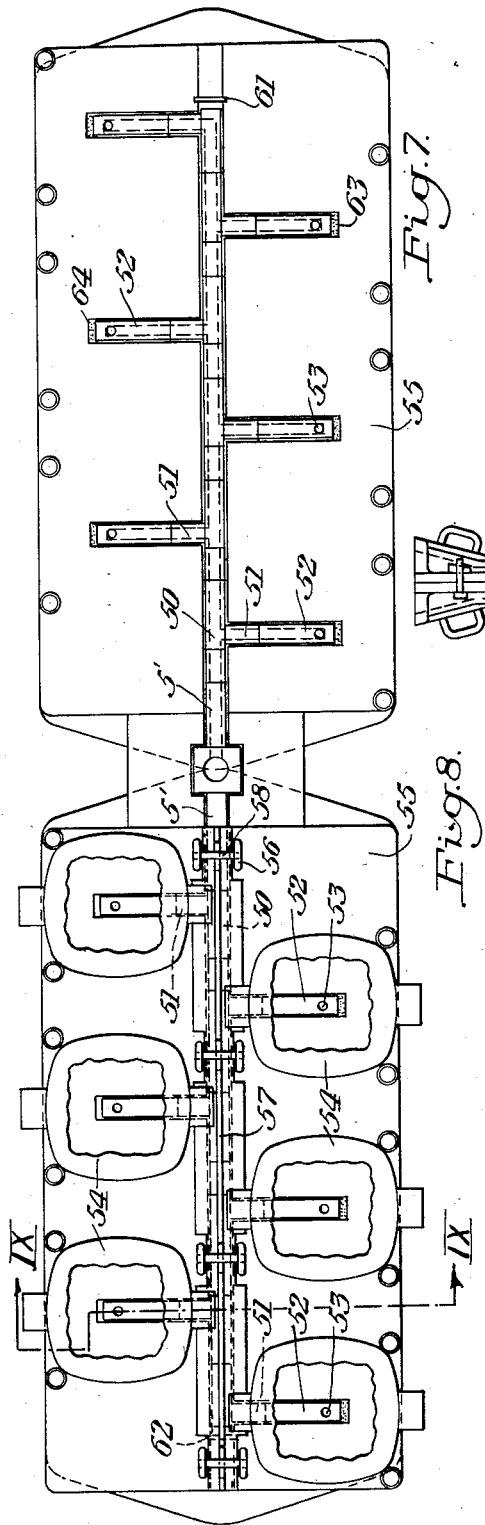
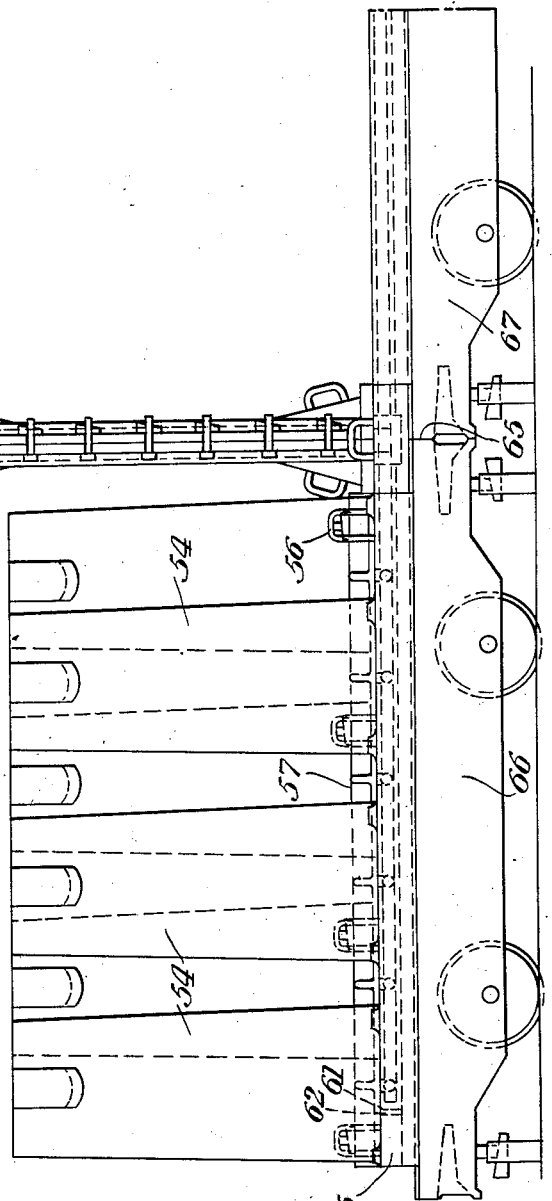

July 30, 1935. F. B. McKUNE 2,009,699
APPARATUS FOR BOTTOM POURING
Filed Nov. 26, 1932 8 Sheets-Sheet 7
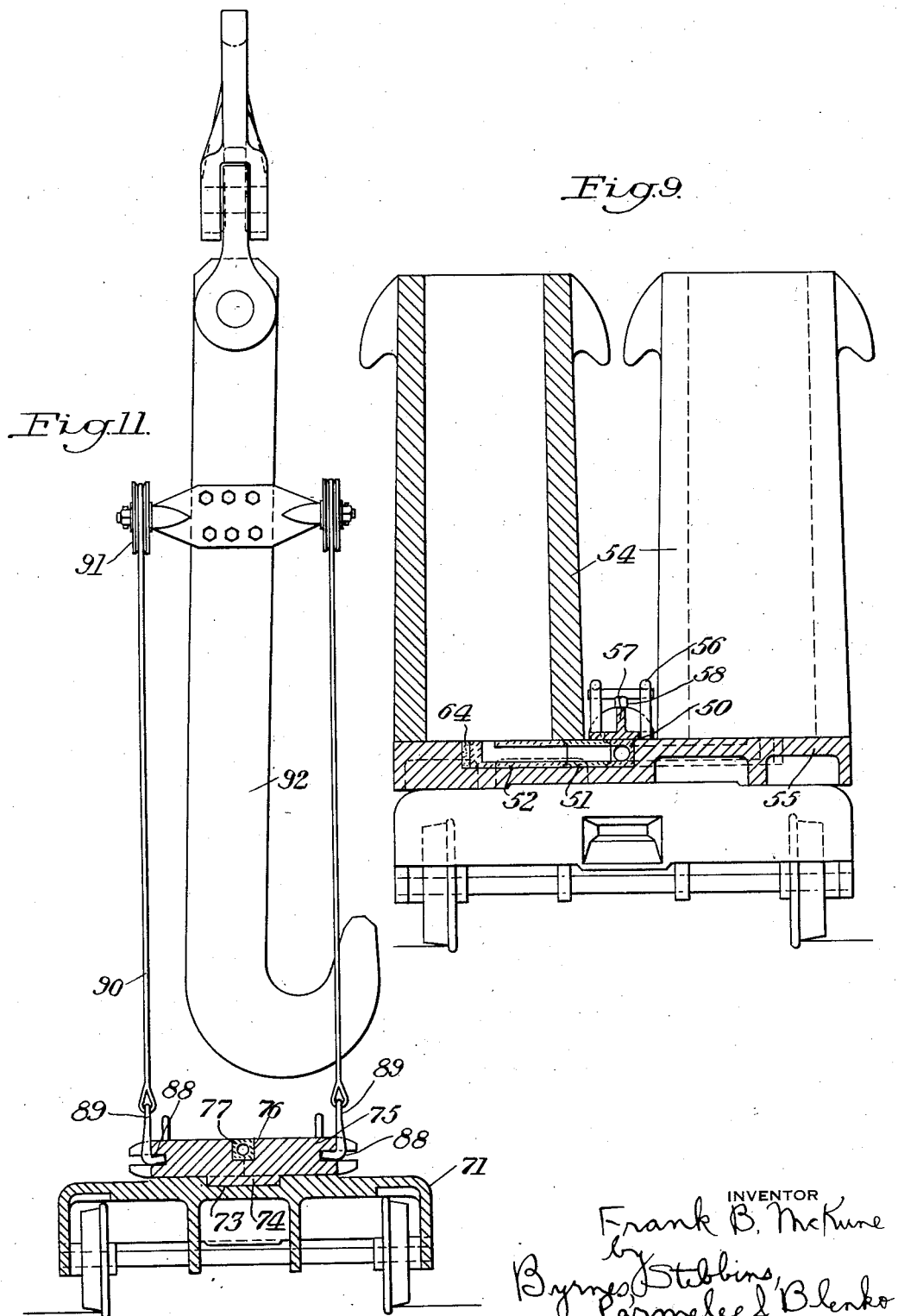

July 30, 1935. F. B. McKUNE 2,009,699
APPARATUS FOR BOTTOM POURING
Filed Nov. 26, 1932 8 Sheets-Sheet 8
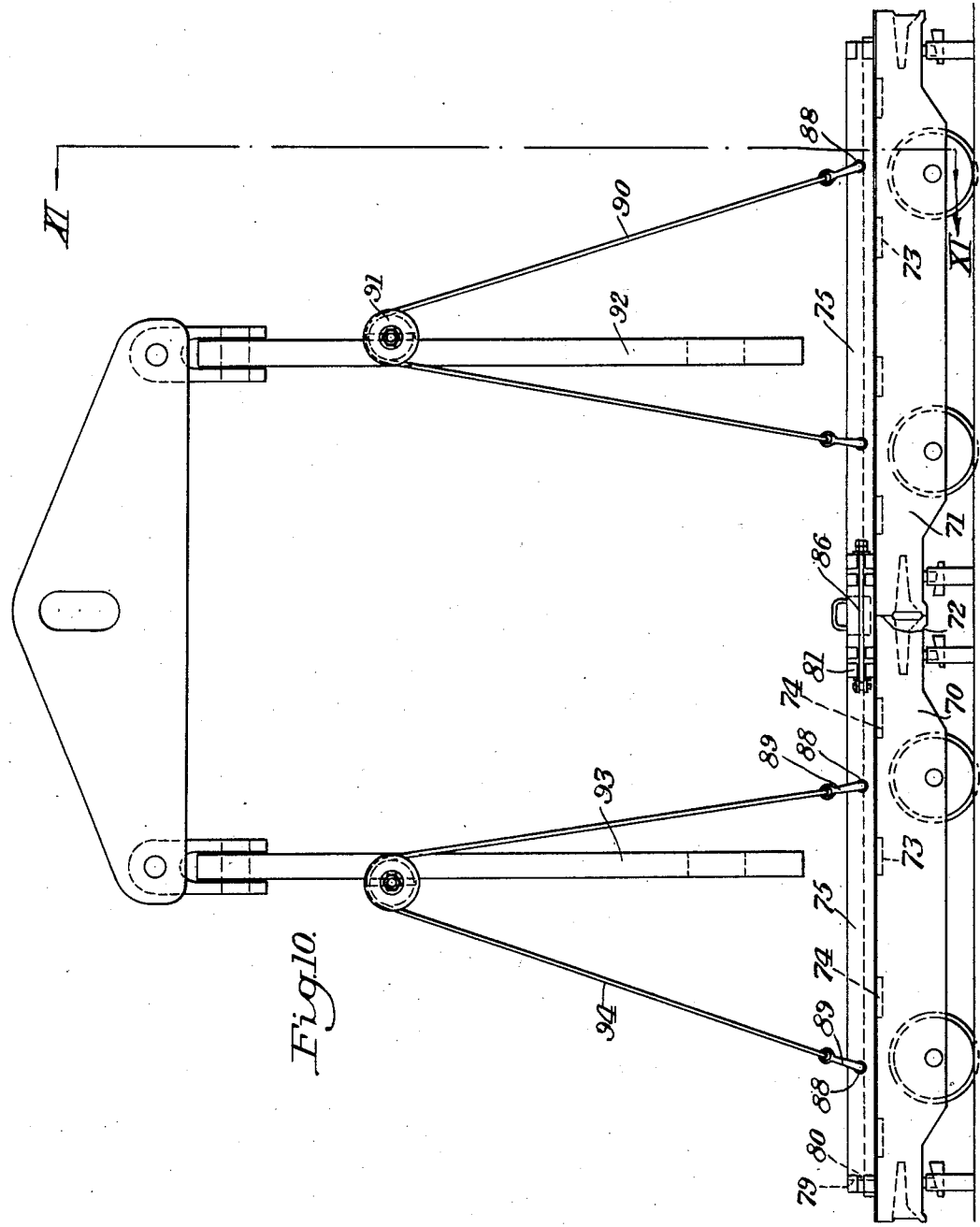
INVENTOR
Frank B. McKune
by Byrnes, Stebbins, Parmelee & Blenko
his attorneys.

Patented July 30, 1935

2,009,699

UNITED STATES PATENT OFFICE 2,009,699

APPARATUS FOR BOTTOM POURING

Frank B. McKune, Hamilton, Ontario, Canada

Application November 26, 1932, Serial No. 644,447

19 Claims. (Cl. 22—141)

The present invention relates broadly to the art of metal casting, and more particularly to that phase of the art commonly referred to in the industry as bottom pouring.

It is well recognized that there are many advantages inherent in the bottom pouring process, which advantages cannot be obtained by the top pouring. Among these advantages may be mentioned the elimination of splash, and the greater ease of simultaneously pouring a plurality of ingots from a common runner. Installations, however, available for bottom pouring have usually been such as to either make the bottom pouring operation extremely slow, extremely laborious, or unduly expensive.

It is one of the objects of the present invention to provide apparatus for bottom pouring which enables the user to change from the usual top pouring procedure to bottom pouring, and the reverse; thus making it possible to pour ingots from the top when this is the most advantageous procedure for the type of ingot desired, or to pour from the bottom when best results will be obtained by such procedure. A further object of the present invention is to render the bottom pouring equipment mobile so that after a desired quantity of ingots has been bottom poured, the equipment may be put to one side or in storage so as to permit pouring to proceed by the top pouring procedure.

The foregoing and other advantages of the invention will be apparent by reference to the following specification and accompanying drawings forming a part thereof, and wherein certain preferred embodiments of the invention are illustrated.

In the drawings—

Figure 1 is a perspective view (omitting the cars, stools, etc.) of a funnel brick, runner brick, center brick, feeder brick and sprue brick layout for one form of bottom pour system which I may use on mobile supports;

Figure 2 is a vertical sectional view through the brick layout of Figure 1 in position in a runner stool and stool mounted on cars in accordance with my invention;

Figure 3 is a side elevational view of a layout in accordance with Figures 1 and 2;

Figure 4 is an exploded perspective view illustrating the runner stool and stool with the center brick, feeder brick and sprue bricks in position therein;

Figure 5 is a perspective view of the key-bolt for locking the runner stool and runner in position;

Figure 6 is a view similar to Figure 1 illustrating a modified embodiment of the invention;

Figure 7 is a top plan view of a layout in accordance with Figure 6, molds being illustrated in cooperative relation to half of the feeder bricks;

Figure 8 is a side elevational view of the structure illustrated in Figure 7;

Figure 9 is a transverse sectional view on the line IX—IX of Figure 7;

Figure 10 is a side elevational view of another embodiment of the invention;

Figure 11 is a transverse sectional view along the line XI—XI of Figure 10, looking in the direction of the arrows; and Figure 12 is a top plan view of the runner stool clamped in operative position between the ingot stools.

In Figure 1 of the drawings, I have shown diagrammatically and in perspective a refractory layout for one type of bottom pour system in accordance with my invention. As illustrated in this layout, there is provided a funnel brick 2 which cooperates with a series of vertically superimposed runner bricks 3 all of which are of similar construction adapted to receive molten metal from the funnel brick and deliver it into a center brick 4. This center brick is herein illustrated as cooperating on two opposite sides thereof with sprue bricks 5, which sprue bricks alternate with feeder bricks 6 having feeding openings 7 arranged in the upper walls thereof.

By reference more particularly to Figure 2, it will be noted that the funnel brick 2 is provided with a projection 8 on the lower end thereof adapted to fit into a correspondingly shaped depression 9 in the upper end of one of the runner bricks 3, the opposite end of each runner brick being shaped similarly to the bottom of the funnel brick for interlocking engagement with the runner brick immediately adjacent thereto. The projection 11 on the bottom runner brick 3 is adapted to enter an opening 12 in the top wall of the center brick 4, which opening communicates with laterally extending openings 14 communicating with the openings in the adjacent sprue bricks 5. The center brick is provided around each of the openings 14 with a recess 15 adapted to receive and interlock with projections 16 on the sprue bricks in engagement therewith.

As will be apparent from the drawings, the sprue bricks and feeder bricks are of generally similar construction with projections on one end and depressions on the opposite end adapted to interfit and lock the bricks, when assembled, against accidental displacement. The feeder openings 7 communicate with the longitudinally extending openings 17 in the feeder bricks and serve to feed metal which has been delivered into the sprue bricks and feeder bricks from the runner bricks 3 into molds or the like in which the castings are to be made.

In Figure 3, I have illustrated four similar molds 18 on each side of the center brick 4, and have shown the funnel brick and runner bricks as being clamped in position between the two halves 19 and 20 of a runner. The interior of the runner is of suitable configuration to receive the funnel brick and runner bricks, and the sections thereof are clamped in position by means of the transversely extending bolts 21 having heads 22 at one end and slotted to receive tapered keys 23 adjacent the opposite ends.

The bottom surface of the runner sections is preferably machined to fit accurtely on the top surface 24 of a runner stool comprising identical half sections 25 and 26. As will be apparent more particularly from Figure 4 of the drawings, each of the half sections adjacent its inner edge is cut away so that when the half sections are assembled, as shown in Figure 4, there is provided a trough or channel 27. Communicating with this trough or channel is a central pocket 28 of such dimensions as to receive the center brick 4 and maintain the same in position. In like manner the trough 27 is of such dimensions as to receive, protect and hold in the desired operative relationship, the adjacent ends of the sprue bricks 5.

As will be noted from Figures 2 and 4, the sprue bricks 5 adjacent the runner stool are so arranged that approximately half of each sprue brick extends into the channel 27, and the other half thereof extends into a similar channel 29 in one of the mold stools 30. In this manner, the sprue brick adjacent the center brick breaks the joint between the runner stool sections 25 and 26 and the ingot stools 30. This is one important feature of my invention, as the ingots and ingot stools are to be left on the cars, while the runner with its stool will generally be taken away after the ingots are poured.

As the most important feature of my invention is to provide a bottom pour system which shall be mobile, the entire brick, runner and stool structure before referred to is of such dimensions as to be bodily mounted on suitable cars 31 and 32, as is apparent from Figures 2 and 3. These cars are provided with recesses 33 on their upper surfaces adapted to receive projections 34 formed on the bottom of the ingot stools 30, thereby interlocking the stools with the cars and preventing relative endwise movement therebetween. The arrangement of the recesses 33 and the projections 34 is such that with the stools 30 in position on the cars there is just room therebetween for the reception of the runner stool, the runner stool thus being positioned with its center line substantially coinciding with the meeting plane 36 between the ends of the cars, with the joint 37 between the runner stool sections 25 and 26 crossing the meeting plane 36 and extending at substantially right angles thereto.

The cars themselves may be of usual construction, the opposite ends thereof, during a pouring operation, being directly supported primarily by jacks 38. It will be understood that, due to the great weight of the molten metal poured through the runner and along the sprues into the molds, there would be a flexing of the spring supports of the cars 31 and 32 as pouring progressed, which would almost certainly result in uneven settling of the cars. By use of the jacks 38, relative movement between the cars constituting part of a pouring unit is precluded, and breakage of the refractory structure thus prevented.

As shown in Figure 4, each runner stool half section is provided with a lifting lug 39 suitably secured thereto and with two symmetrically arranged locking bolt openings 40. These openings in the upper surface of the half sections are of generally elongated form, communicating with circular openings 41 on the under-side of the stool. The elongated openings 40 are of such dimensions that they are adapted to receive the elongated head 42 of a runner stool key-bolt, with the head arranged in proper relationship to the opening.

A bolt head, having been passed downwardly through the opening 40 into the circular opening 41, may then be turned through substantially 90° to dispose the head 42 transversely with respect to the major axis of the opening 40 and prevent the bolt from being drawn upwardly through the opening. When so arranged the actual bolt 43 projects upwardly through the opening 40 and is adapted to extend through one of the openings 44 in the base of the runner half sections 19 and 20 and project above the upper surface thereof to a sufficient extent to receive a wedging or locking key 45. By utilizing four symmetrically arranged bolts of the character referred to, the runner half sections 19 and 20 may be securely interlocked with the runner stool half sections 25 and 26, it being noted that when assembled the meeting plane 46 between the faces of the runner half sections 19 and 20 extends at right angles to the meeting plane 37 between the runner stool half sections, and in line with and parallel to the meeting plane 36 between the adjacent cars. Thus the runner stool half sections serve to break the joint between the cars and the runner half sections and minimize possibility of damage even should the jacks 38 not be utilized or should they fail to be properly adjusted.

After a pouring operation has been completed, the keys 45 may be knocked out of position, the runner half sections 19 and 20 bodily removed from the runner stool half sections, and the runner stool half sections in turn slipped out of position so as to disconnect the cars and permit them to be individually moved to any desired position, or to be simultaneously moved while permitting a relative movement to such an extent as to enable them to pass around curves in the track system.

In Figure 6 there is illustrated a form of layout generally similar to that shown in Figure 1, but differing therefrom principally in the fact that the sprue bricks 5′ cooperate with feeder bricks 50 having laterally extending openings adapted to communicate with the openings in transversely extending feeder bricks 51, which in turn fit feeder bricks 52, the openings 53 in which are adapted to cooperate with molds 54 as shown in Figures 7, 8 and 9. These molds may be arranged in any desired relationship, a satisfactory staggered relationship having been shown in the drawings.

The stools 55 for cooperation with the brick system shown in Figure 6 are illustrated as formed with yokes or eyes 56 spaced to receive therebetween a feeder brick clamping plate 57 which may be locked in position by disposing suitable keys 58 over the clamping plate with their ends in the eyes 56.

In order to prevent endwise movement of the bricks in the stools, the stools 30 are shown as formed with end slots 59 adapted to receive plates 60, while the stools 55 are provided with similar slots 61 for corresponding plates 62. The ends of the transverse channels 63 in the stools 55 may be luted or filled with refractory 64 as illustrated in Figure 9 to preclude transverse movement of the bricks 51 and 52 to such an extent as to permit disengagement therebetween, or disengagement between the same and the sprue bricks 50.

With the construction shown in Figures 6 to 9, both inclusive, it will be noted that similarly to the figures heretofore described, the axis of the runner bricks lies in the meeting plane 65 between the ends of the adjacent cars 66 and 67 so that removal of the runner bricks and runner stool sections will disconnect two cars for normal handling, while the assembly of the parts makes it possible to simultaneously pour ingots positioned on a plurality of cars. My invention therefore contemplates as one feature thereof the bottom pouring of a plurality of molds arranged on adjacent cars by the utilization of runner brick having their flow axes lying substantially in the meeting plane of the ends of the adjacent cars carrying the molds, and more particularly where the runner stool is arranged in sections so as to facilitate lateral movement thereof, with the half sections meeting along a line which is preferably substantially parallel to the longitudinal axes of the cars and at right angles to the meeting plane of the car ends.

In Figures 10, 11 and 12, there is shown another embodiment of my invention for the purpose of further illustrating the advantages obtainable by the use of a bottom pour system incorporating the principles herein described. In these figures there are shown adjacent cars 70 and 71 having a meeting plane 72 therebetween. Similarly to the cars first referred to, the upper surfaces may be provided with recesses 73 adapted to receive projections 74 on the bottoms of stools 75, which stools are not only bi-laterally symmetrical with respect to a longitudinal axis, but anteriorly and posteriorly symmetrical with respect to a transverse axis, whereby they may be reversed end for end. Each of the stools 75 is shaped to provide a longitudinally extending channel 76 for the reception of sprue bricks 77 and feeder bricks 78 as before described, and adjacent each end of the channel 76 with suitable slots 79 adapted to receive plates 80.

Projecting from the sides of the stool 75 adjacent each end thereof are ears 81 adapted to cooperate with similar ears 82 projecting outwardly from runner stool half sections 83 and 84 generally similar to the runner stool half sections 25 and 26 before described, the meeting plane 85 between which extends transversely to the meeting plane 72.

With the stool 75 in proper position on opposite sides of runner stool half sections, as shown for example in Figure 12, clamping bolts 86 are placed through the slots between the lugs 81 and 82, and the cam levers 87 swung into clamping position as illustrated in Figure 12 for securely locking the parts together as a unit.

Provided at suitable points in the sides of the stool 75, are openings 88 adapted to receive lifting hooks 89. As shown more particularly in Figure 10 of the drawings, one such lifting hook is arranged on each end of a cable 90 passing over a sheave 91 on one hook 92 of a standard ladle crane. The other hook 93 carries a similar cable 94 with a pair of lifting hooks 89. This structure is duplicated on the opposite side of the crane hooks, as will be apparent from Figure 11. The use of sheaves enables the respective cables to exactly equalize the loads, thereby permitting a complete unit including two stools with the intermediate runner stool half sections to be deposited on cars as a unit, or removed therefrom as a unit either with the molds in position thereon, or removed therefrom. This makes it possible to utilize one set of cars as often as such set can be taken to the mills or stripper, or to utilize the same stools as may be desired in any other part of a plant, the stools being capable of being utilized if desired without the provision of any pouring pits.

If the cars are utilized, after a pouring operation has been completed, the center connection including the runner stool half sections is bodily moved out of place by sliding the half sections laterally. By reference to Figures 10 and 12, it will be noted that these half sections have ribs 95 which overlap extensions 96 on the stools 75, thereby further stiffening the structure without interfering with the desired lateral movement of the runner stool half sections.

It has been found from actual experience that in utilizing a system in accordance with the invention herein disclosed, there is no difficulty in getting the sprues off the ingots at the mill, the present method largely overcoming the difficulties in this respect which have heretofore been encountered. This constitutes one decided advantage of the present invention.

It will also be apparent that with a set-up as shown more particularly in Figures 10, 11 and 12, the cars or buggies need not be used exclusively for bottom pouring of ingots, it being possible to place the stools to one side or in storage, thus freeing the buggies for use in regular service as for instance for top pouring. The system therefore does not interfere with the regular use of buggies, or unduly tie up any equipment, nor involve large expenditures for plant and new equipment.

I have also found that there is practically very little more labor required in accordance with the present system than is necessary in connection with the top pouring of ingots. The flexibility of the installation makes it possible to pour any desired number at a time, it being possible to continue the number of cars almost indefinitely without departing from the spirit of the invention, although it is desirable, for reasons pointed out, to support the ends of the cars independently of the usual wheels so as to insure maintaining the desired relationship of the cars during a casting operation.

While I have herein illustrated and described certain preferred embodiments of the invention, it will be understood that changes in the construction, operation and relationship of the parts may be made without departing either from the spirit of the invention or the scope of my broader claims.

I claim:

1. In a bottom pour system, a pair of supports temporarily adjacent each other, the supports being mobile, a pair of mold stools, one mounted on each support, a runner stool interposed between said mold stools and connected with a mold stool by an alining element engaging adjacent portions of said runner stool and said last mentioned mold stool, means for feeding molten metal to the runner stool, and means for feeding such metal from the runner stool to the mold stools.

2. In a bottom pour system, a pair of supports temporarily adjacent each other, the supports being mobile, a pair of molds one mounted on each support, and means for feeding metal to the molds through the bottoms thereof comprising mold stools, a runner stool interposed between said mold stools and bridging the joint between said supports, a runner mounted on said runner stool and refractory material in said stools and runner.

3. In a bottom pour system, a pair of supports temporarily adjacent each other, the supports being mobile with the joint between the two extending transversely relative to the normal direction of movement of the supports, a pair of mold stools, one mounted on each support, a sectional runner stool interposed between said mold stools and bridging said joint, the sections of the runner stool meeting along a line substantially parallel to the longitudinal axes of the supports and at right angles to said transversely extending joint, means for feeding metal to the runner stool, and means for feeding such metal from the runner stool to the mold stools.

4. In a bottom pour system, a pair of supports temporarily adjacent each other, the supports being mobile with the joint between the two extending transversely relative to the normal direction of movement of the supports, a pair of mold stools, one mounted on each support, a sectional runner stool interposed between said mold stools and bridging said joint, the sections of the runner stool meeting along a line substantially parallel to the longitudinal axes of the supports and at right angles to said transversely extending joint, means for interlocking the stools against vertical movement of one relative to the others while permitting lateral withdrawal of the sections of the runner stool, means for feeding metal to the runner stool, and means for feeding such metal from the runner stool to the ingot stools.

5. In a bottom pour system, a series of supports wheel mounted for movement over tracks, the joints between adjacent supports extending transversely to the normal direction of movement of the supports, a pair of mold stools mounted on an adjacent pair of said supports, a runner stool interposed between said mold stools and bridging the joint between said adjacent pair of supports, molds fed through their bottoms mounted on said mold stools, means for feeding metal to the runner stool, and means for feeding such metal by way of the mold stools to the bottoms of said ingot molds.

6. In a bottom pour system, a series of supports temporarily adjacent each other, the supports being mobile, a series of mold stools one mounted on each support, a center stool interposed between a pair of adjacent mold stools and bridging the joint between the corresponding pair of supports, a center brick carried by said center stool, runner brick feeding said center brick and having a feeding axis substantially in the plane of the joint between said supports, sprue brick carried by said stools, said sprue brick leading from said centre brick and terminating short of the ends of the stools, and means preventing endwise movement of said sprue brick relative to said stools.

7. In a bottom pour system, a pair of adjacent supports normally yieldable under load, props for temporarily preventing lowering movement of said supports, a pair of mold stools, one mounted on each support, a runner stool interposed between said mold stools, said runner stool and each mold stool being provided with portions adapted to receive a connecting rod, a connecting rod cooperating with said portions to aline said stools, and refractory carried by the respective stools.

8. In a bottom pour system, a pair of adjacent supports normally yieldable under load, props for temporarily preventing lowering movement of said supports, a pair of molds one mounted on each support, and means for feeding metal to the molds through the bottom thereof comprising a pair of mold stools, one mounted on each support, a sectional runner stool interposed between said mold stools and alined with said mold stools by portions of the runner stool bearing upon underlying portions of the mold stools, said runner stool bridging the adjacent ends of said supports and removable by separating the sections and withdrawing them laterally, means for feeding molten metal to the runner stool, and means for feeding such metal from the runner stool to the mold stools and thence to the molds.

9. In a bottom pour system, a pair of supports temporarily adjacent each other, the supports being mobile, a runner stool bridging the adjacent ends of said supports, said runner stool having a central recess for receiving a center brick, channels extending in opposite directions from said central recess to receive sprue bricks, and a parting along said oppositely extending channels separating said stool into sections to permit withdrawal of the sections of said stool prior to moving one or both of said supports.

10. In a bottom pour system, a series of wheeled supports, the joints between adjacent supports extending transversely relative to the normal direction of movement of the supports, a pair of mold stools mounted on an adjacent pair of said supports, molds mounted on said stools, a runner stool interposed between said mold stools and bridging the joint between said adjacent pair of supports, sprue brick received in recesses in said stools for feeding metal to said molds through their bottoms, and a runner mounted on said runner stool for conducting molten metal downwardly for delivery to said sprue brick.

11. In a bottom pour system, a series of supports wheel mounted for movement over tracks, the joints between adjacent supports extending transversely to the normal direction of movement of the supports, a pair of mold stools mounted on an adjacent pair of said supports, a sectional runner stool interposed between said mold stools and bridging the joint between said adjacent pair of supports, the sections of the runner stool meeting along a line substantially parallel to the longitudinal axes of the supports and at right angles to said transversely extending joint, a runner mounted on said runner stool, refractory material in said runner and stools, and molds fed thereby through their bottoms mounted on said mold stools.

12. In a bottom pour system, a series of supports wheel mounted for movement over tracks, the joints between adjacent supports extending transversely to the normal direction of movement of the supports, said supports having recesses in the supporting surfaces thereof, an ingot stool on each support having a projection fitting in the recess therein, a runner stool interposed between the ingot stools on adjacent supports and bridging the joint between said supports, a runner mounted on said runner stool and refractory material in said stools and runner.

13. In a bottom pour system, a pair of supports temporarily adjacent each other, the supports being mobile, a pair of ingot stools one mounted on each support, a sectional runner stool interposed between said ingot stools and bridging the joint between said supports, the sections of the runner stool meeting along a line substantially parallel to the longitudinal axes of the supports and at right angles to the joint between said supports, the runner stool and ingot stools having interengaging portions for preventing vertical movement of one relative to the other while permitting lateral withdrawal of the sections of the runner stool, a runner mounted on said runner stool, means for interlocking said runner and runner stool, and refractory material in said runner and stools.

14. In a bottom pour system, a pair of ingot stools, a sectional runner stool interposed between said ingot stools, the meeting plane between the sections of the runner stool extending longitudinally, the runner stool and ingot stools having overlapping portions preventing vertical movement of one relative to the others while permitting lateral withdrawal of the sections of the runner stool, and refractory material carried by the respective stools.

15. In a bottom pour system, a pair of ingot stools, a sectional runner stool interposed between said ingot stools, the meeting plane between the sections of the runner stool extending longitudinally, means for preventing vertical movement of the ingot stools relative to the runner stool while permitting lateral withdrawal of the sections of the runner stool, means for securing the stools in assembled relation, refractory material carried by the respective stools, and means for simultaneously raising or lowering all of said stools.

16. In a bottom pour system, a car mounted on wheels for movement over a trackway, a second car similarly mounted and adjoining the first car, a center brick bridging the joint between said cars, vertical runner brick feeding said center brick and having a feeding axis substantially in the plane of the joint between said cars, a plurality of molds at least one mounted on each car, and sprue brick leading from said center brick to feed metal to said molds through their bottoms.

17. In a bottom pour system, a car having wheels for engaging a track and movable thereover, a second wheel mounted car similarly movable and adjoining the first car, a pair of ingot molds one mounted on each car, means for feeding metal to the molds through the bottoms thereof comprising a runner stool bridging the adjacent ends of said cars, an ingot stool carried by each car, means for centering the stools thereon, means for feeding molten metal to the runner stool, and means for feeding such metal from the runner stool to the ingot stools and thence to the molds, and props for temporarily preventing downward yielding of the adjacent ends of said cars under load.

18. In a bottom pour system, a car having wheels for movement over a trackway, a second car similarly movable and adjoining the first car, a plurality of ingot molds at least one mounted on each car, and means for feeding metal to the molds through the bottoms thereof comprising a runner stool bridging the adjacent ends of said cars, an ingot stool carried by each car, means for interlocking said runner stool with said ingot stools against vertical movement of one relative to the others, means for feeding molten metal to the runner stool, and means for feeding such metal from the runner stool to the ingot stools and thence to the molds through their bottoms.

19. In a bottom pour system, a car having wheels for movement over a trackway, a second wheel mounted car similarly movable and adjoining the first car, a pair of mold stools, one mounted on each car, a runner stool interposed between said mold stools and bridging the joint between said cars, refractory material carried by the respective stools, and props for temporarily preventing downward yielding of the adjacent ends of said cars under load.

FRANK B. McKUNE.